(12) United States Patent
Epshteyn et al.

(10) Patent No.: US 10,496,653 B1
(45) Date of Patent: Dec. 3, 2019

(54) DATA WORKFLOW ANALYSIS SERVICE

(71) Applicant: Amazon Technologies, Inc., Seattle, WA (US)

(72) Inventors: Ilya Epshteyn, Highland Park, NJ (US); Roger Alan Dahlstrom, New Windsor, NY (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 15/460,085

(22) Filed: Mar. 15, 2017

(51) Int. Cl.
*G06F 16/2457* (2019.01)

(52) U.S. Cl.
CPC .............................. *G06F 16/24578* (2019.01)

(58) Field of Classification Search
CPC ........... G06F 17/3053; G06F 17/30554; G06F 17/3056; G06F 17/30563; G06F 16/24578
See application file for complete search history.

(56) References Cited

U.S. PATENT DOCUMENTS

| | | | | |
|---|---|---|---|---|
| 6,778,193 | B2 * | 8/2004 | Biebesheimer | G06F 17/30528 715/805 |
| 2005/0108094 | A1 * | 5/2005 | Hugron | G06Q 30/02 705/14.44 |
| 2008/0189631 | A1 * | 8/2008 | Emerson | G06Q 10/00 715/764 |
| 2009/0171889 | A1 * | 7/2009 | Friedlander | G06F 17/30312 |
| 2013/0246778 | A1 * | 9/2013 | Nikara | H04L 41/0816 713/1 |
| 2013/0297390 | A1 * | 11/2013 | Jaquez | G06Q 20/36 705/14.23 |
| 2014/0129288 | A1 * | 5/2014 | Eager | G06Q 30/0185 705/7.29 |
| 2014/0280482 | A1 * | 9/2014 | Crosley | H04L 41/0246 709/203 |
| 2014/0324740 | A1 * | 10/2014 | Garera | G06N 5/022 706/12 |
| 2014/0365518 | A1 * | 12/2014 | Calo | G06F 17/30401 707/760 |
| 2015/0379676 | A1 * | 12/2015 | Girado | G06T 1/20 345/501 |
| 2017/0032143 | A1 * | 2/2017 | Kong | H04L 63/102 |
| 2017/0109191 | A1 * | 4/2017 | Bhasin | G06F 9/45558 |
| 2018/0143854 | A1 * | 5/2018 | Kumar | G06F 9/4881 |

* cited by examiner

*Primary Examiner* — James Trujillo
*Assistant Examiner* — Michal Lawrence Bogacki
(74) *Attorney, Agent, or Firm* — Davis Wright Tremaine LLP

(57) ABSTRACT

A data workflow analysis service implements techniques for determining a set of applications that implement a data processing workflow according to a set of attributes and a set of metrics. A set of applications is selected based on the attributes and the metrics, a specification is generated indicating a configuration for the set of applications, the specification is evaluated to determine a suitability score for the specification, and the data workflow analysis service determines whether to implement the set of applications according to the specification.

20 Claims, 10 Drawing Sheets

| | Application$_0$ | Application$_1$ | Application$_2$ | ... | Application$_n$ |
|---|---|---|---|---|---|
| Attribute$_0$ | Score$_{00}$ | Score$_{01}$ | Score$_{02}$ | ... | Score$_{0n}$ |
| Attribute$_1$ | Score$_{10}$ | Score$_{11}$ | Score$_{12}$ | ... | Score$_{1n}$ |
| Attribute$_2$ | Score$_{20}$ | Score$_{21}$ | Score$_{22}$ | ... | Score$_{2n}$ |
| ... | ... | ... | ... | ... | ... |
| Attribute$_m$ | Score$_{m0}$ | Score$_{m1}$ | Score$_{m2}$ | ... | Score$_{mn}$ |

Specified Data Workflow Attributes

DATA WORKFLOW ANALYSIS SERVICE

BACKGROUND

Computer users seeking to reduce the expense and overhead associated with maintaining their own computing resources have turned to purchasing computing services offered by computing resource service providers. Such computing services are often configurable and scalable to meet various computing needs of the computer users and to provide high availability. The use of hosted computing services and storage has proliferated in recent years where the resources for network computing and storage are often provided by computing resource providers that leverage large-scale networks of computer systems to host and execute a variety of applications and services. This variety of applications and services can provide a significant number of potential solutions for a particular problem. Customers with data processing needs who wish to host their data processing using services and resources provided by the computing resource service provider to take advantage of increased availability and scalability may find that determining which data processing pipeline configuration will meet their needs can be challenging.

BRIEF DESCRIPTION OF THE DRAWINGS

Various techniques will be described with reference to the drawings, in which:

FIG. 7 illustrates a diagram where an example decision matrix is used to select applications for a data processing pipeline configuration using a data workflow analysis service;

DETAILED DESCRIPTION

Figure 1:
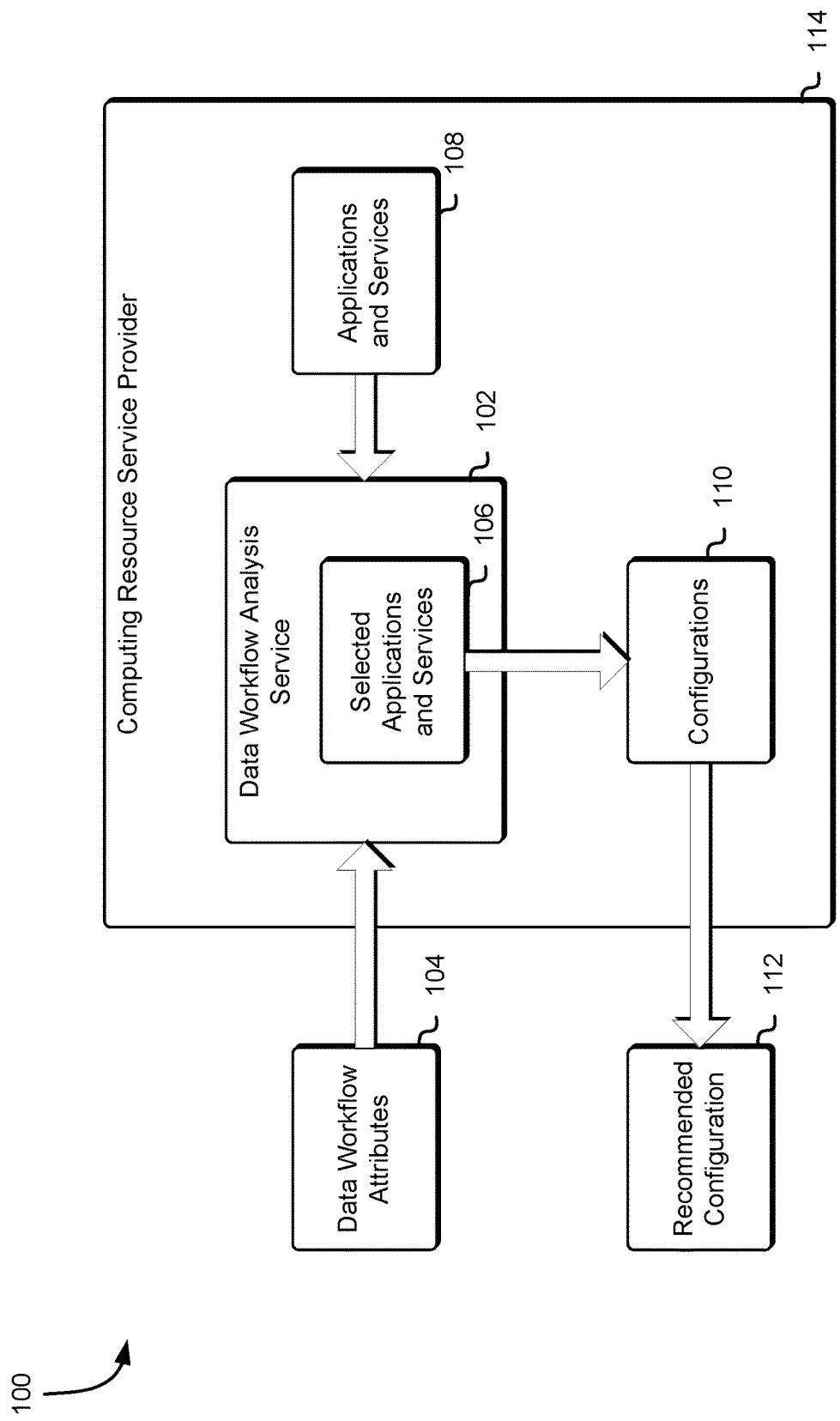
FIG. 1 illustrates an example environment where a data workflow is analyzed and a recommended data processing pipeline configuration is provided using a data workflow analysis service.

A computing resource service provider provides customers with access to various computing resources to execute and/or operate applications on behalf of the customer. Customers of a computing resource service provider frequently have data processing requirements where the customer has a data processing pipeline for processing the data. In one embodiment, this data processing pipeline is an existing data processing pipeline that is implemented on computing resources owned or operated by the customer. In one embodiment, this data processing pipeline is a proposed data processing pipeline that the customer would like to implement. In one embodiment, when a customer decides to host this data processing pipeline on computing resources hosted by the computing resource service provider, the customer specifies data workflow attributes for this data processing pipeline and the computing resource service provider provides a recommended configuration for the data processing pipeline according to those workflow attributes. The recommended configuration for the data processing pipeline includes a set of applications and/or services that run on computing resources hosted by the computing resource service provider that are selected according to the workflow attributes as described herein.

In one embodiment, the data workflow attributes include attributes associated with query performance such as data throughput and query speed. In one embodiment, the data workflow attributes include attributes associated with the volume of the data such as the current volume of the data and the growth rate of the data over time. In one embodiment, the data workflow attributes include attributes associated with the speed of the data such as the time to produce a result from the data, the incoming speed of the data, and whether the data arrives in periodic batches or in a continuous stream. In one embodiment, the data workflow attributes include attributes associated with the type of the data such as whether the data is structured, semi-structured, or unstructured and whether the data includes text, images, audio, video, or multiple data types. In one embodiment, the data workflow attributes include attributes associated with processing the data such as any pre-processing operations that are performed on the data, any correlation operations between parts of the data, any additional data that is needed to process the data, how reliable the data is, what should be done with unreliable data, and whether there are custom processing applications that are performed on the data to determine results. In one embodiment, the data workflow attributes include attributes relating to the data such as the location of the data, metadata associated with the data, and security and/or regulatory requirements associated with the data. In one embodiment, the data workflow attributes include a location of the sample data set that is used to further determine the set of applications and/or services that are used to implement the data processing pipeline. In one embodiment, the data workflow attributes include limitations and/or considerations associated with the cost to implement the data processing pipeline including, but not limited to, costs for licensing of the applications or services, cost limits (e.g., "not to exceed" costs), preferences based on in-house expertise, preferences based on previously implemented and/or custom applications, and other such cost limitations and/or considerations.

In one embodiment, a data workflow analysis service receives a set of data workflow attributes and uses the set of workflow attributes to determine a set of applications and services that are used to implement the data processing pipeline by evaluating the suitability of each application of the plurality of applications and services based on the workflow attributes. In one embodiment, the data workflow analysis service uses a decision matrix to generate a suitability score for each application and service of the plurality of applications and services based at least in part on the data workflow attributes and selects the set of applications and services with high suitability scores. In one embodiment, the data workflow analysis service selects those applications and services with suitability scores over a threshold value. In one embodiment, if no application or service has a suitability score over the threshold value for a stage of the data processing pipeline, the application or service with the highest suitability score is selected. In one embodiment, the data workflow analysis service selects one or more applications and/or services for each of one or more stages of the data processing pipeline. In one embodiment, the stages of the data processing pipeline include data retrieval, data pre-processing, data processing, data post-processing, and data disposal.

In one embodiment, data retrieval is the stage of the data processing pipeline where the data that is processed by the data processing pipeline is retrieved from a data storage location. In one embodiment, the data workflow analysis service determines one or more applications and/or services that are used to perform the data retrieval based at least in part on the data workflow attributes as described herein. In one embodiment, the data that is retrieved is retrieved from a data storage location specified with the data workflow attributes. In one embodiment, the data that is retrieved is a subset of a larger set of data that is stored in a data storage location specified with the data workflow attributes. In one embodiment, the data that is a subset of a large set of data is extended by repeating the processing of the subset of the larger set of data to mimic the data size of the larger set of data (e.g., if the larger set of data is for twenty-four hours and the subset of the larger set of data is for one hour, the subset is repeated twenty-four times to mimic the data size of the larger set of data). In one embodiment, the data that is retrieved is retrieved from a test data set that is selected based at least in part on one or more of the data workflow attributes.

In one embodiment, the data that is retrieved is stored in a data storage service such as a database service. In one embodiment, customers of a computing resource service provider are provided with access to a database service and the database service provides customers with access to various databases. In one embodiment, these databases include single instance databases or databases that are distributed between computing resources, data centers, regions, or zones (e.g., fault zones or availability zones) of the computing resource service provider. A distributed database is maintained across multiple different regions (e.g., one or more copies of the database maintained by computing resources in each region) to provide availability and reduced latency when accessing the database in the various regions. In one embodiment, these databases are structured query language ("SQL") databases. In one embodiment, these databases are non-structured ("noSQL") databases. In one embodiment, the data that is retrieved is stored in a data storage service such as a block storage service, an on-demand storage service, an archival storage service, or a backup storage service.

In one embodiment, data pre-processing is the stage of the data processing pipeline where the data that is processed by the data processing pipeline is pre-processed prior to processing. In one embodiment, the data workflow analysis service determines one or more applications and/or services that are used to perform the data pre-processing based at least in part on the data workflow attributes as described herein. In one embodiment, data pre-processing includes removing extraneous data, structuring data, extracting features from data, correlating portions of the data with other portions of the data, and pre-processing the data according to one or more metadata items associated with the data. In one embodiment, the data workflow analysis service retrieves additional data and/or metadata when pre-processing the data as described herein.

In one embodiment, data processing is the stage of the data processing pipeline where the data is processed by the data processing pipeline. In one embodiment, the data workflow analysis service determines one or more applications and/or services that are used to perform the data processing based at least in part on the data workflow attributes as described herein. In one embodiment, data processing includes processing the data to extract inferences from the data (e.g., patterns, features, conclusions, recommendations, etc.). There are a number of data processing applications and services that are frequently used which may be selected by the data workflow analysis service to process the data including, but not limited to, data warehousing solutions at petabyte-scale or greater, map reduce tools, relational and non-relational databases, data analysis languages and services, application development frameworks, and custom data processing applications. In one embodiment, such data processing applications and services are provided by the computing resource service provider. In one embodiment, such data processing applications and services are provided by a customer of the computing resource service provider. In one embodiment, such data processing applications and services are provided by a third party (e.g., provided by a party that is neither the computing resource service provider nor the customer of the computing resource service provider).

In one embodiment, data post-processing is the stage of the data processing pipeline where the data that is processed by the data processing pipeline is post-processed after processing. In one embodiment, the data workflow analysis service determines one or more applications and/or services that are used to perform the data post-processing based at least in part on the data workflow attributes as described herein. In one embodiment, data post-processing includes applications and services that generate additional results from the processed data including, but not limited to, report generators and data visualization tools.

In one embodiment, data disposal is the stage of the data processing pipeline where the data that is processed by the data processing pipeline is disposed after processing. In one embodiment, the data workflow analysis service determines one or more applications and/or services that are used to perform the data disposal based at least in part on the data workflow attributes as described herein. In one embodiment, the policies of data retention (i.e., when to dispose of the data) are specified in the data workflow attributes. In one embodiment, the policies of data retention (i.e., when to dispose of the data) are specified in one or more account policies associated with the customer of the computing resource service provider. In one embodiment, the data that is processed is discarded after it is processed and/or post-processed and one or more results have been obtained from the data. In one embodiment where the data is streaming data that is constantly generated, the data is not retained after it is processed (e.g., analyzed) and results have been obtained.

In one embodiment, the data processing pipeline stages are executed multiple times (e.g., when multiple data retrieval stages are implemented by the data processing pipeline or when multiple data processing stages are implemented by the data processing pipeline). In one embodiment, applications and/or services are executed in multiple stages of the data processing pipeline. In one embodiment, data processing pipeline stages are repeatedly performed in groups on subsets the set of data (e.g., for each subset of the data, the subset is pre-processed, processed, and post-processed).

In one embodiment, after the data workflow analysis service has selected the set of applications and/or services that are used to implement the data processing pipeline (i.e., has selected one or more candidate applications for each stage of the data processing pipeline), the data workflow analysis service generates one or more configurations for the data processing pipeline that specify a set of applications that are used to implement the data processing pipeline. In an illustrative example, if the data workflow analysis service determines that two applications or services are suitable to implement the data retrieval stage of the data processing pipeline, one application or service is suitable to implement the data pre-processing stage of the data processing pipeline, three applications or services are suitable to implement the data processing stage of the data processing pipeline, two applications or services are suitable to implement the data post-processing stage of the data processing pipeline, and no applications or services are suitable to implement the data disposal stage of the data processing pipeline (e.g., because no data disposal is needed), there are twelve (e.g., two times one times three times two) possible configurations for the data processing pipeline. In one embodiment, the data workflow analysis service recommends the best one of these possible configurations for the data processing pipeline. In one embodiment, the data workflow analysis service recommends a plurality of the best of these possible configurations for the data processing pipeline. In one embodiment, the data workflow analysis service recommends all of these possible configurations for the data processing pipeline. In one embodiment, the data workflow analysis service provides an aggregate suitability score for each of the recommended possible configurations for the data processing pipeline. In one embodiment, the data workflow analysis service provides an analysis of each of the recommended possible configurations for the data processing pipeline.

In one embodiment, the data workflow analysis service uses an expert system to provide the recommendation and/or the analysis. In one embodiment, an expert system is an application that uses previously acquired data (e.g., the results of previous analyses of recommended configurations for the data processing pipeline) and uses that data to provide recommendations for configurations for the data processing pipeline. In one embodiment, the expert system stores the previously acquired data in a database associated with the expert system and analyzes the contents of the database to provide recommendations for configurations for the data processing pipeline. In one embodiment, the expert system includes data and/or decision making capabilities based at least in part on recommendations from a human agent (e.g., a subject-matter expert).

In one embodiment, the data workflow analysis service uses a machine learning algorithm based on previous recommendations to evaluate the recommendation prior to providing the recommendation to the customer. In one embodiment, an expert system is an application that uses previously acquired data (e.g., the results of previous analyses of recommended configurations for the data processing pipeline) and uses that data to provide recommendations for configurations for the data processing pipeline. In one embodiment, the machine learning algorithm stores the previously acquired data in a database associated with the machine learning algorithm and analyzes the contents of the database to provide recommendations for configurations for the data processing pipeline. In one embodiment, the expert system includes data and/or decision making capabilities based at least in part on recommendations from a human agent (e.g., a subject-matter expert).

In one embodiment, the recommendation of the data workflow analysis service is additionally evaluated by a data processing expert (e.g., a subject-matter expert) associated with the computing resource service provider prior to being provided to the customer.

In one embodiment, the data workflow analysis service provides a plurality of recommended possible configurations for the data processing pipeline to a customer of the computing resource service provider and the customer selects one of the plurality of recommended possible configurations for the data processing pipeline to implement. In one embodiment, the data workflow analysis service selects a configuration from the plurality recommended possible configurations for the data processing pipeline to implement without customer input. In one embodiment, the data workflow analysis service uses an expert system to select a configuration from the plurality recommended possible configurations for the data processing pipeline to implement. In one embodiment, the data workflow analysis service uses a machine learning algorithm to select a configuration from the plurality recommended possible configurations for the data processing pipeline to implement based at least in part on one or more previous recommendations.

In one embodiment, the data workflow analysis service provides a template that is usable to implement the data processing pipeline (e.g., a specification for each of the applications and services). In one embodiment, the data workflow analysis service implements the data processing pipeline (e.g., instantiates the applications and services of the data processing pipeline) and begins processing the data using the implemented data processing pipeline.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a data workflow is analyzed and a recommended data processing pipeline configuration is provided using a data workflow analysis service in accordance with an embodiment. In the example environment 100 illustrated in FIG. 1, a data workflow analysis service 102 operating within an environment of a computing resource service provider 114 receives a set of data workflow attributes 104 that specify one or more aspects of a data workflow. In one embodiment, the data workflow analysis service 102 uses the data workflow attributes 104 to select one more applications and services from a plurality of applications and services 108. The selected applications and services 106 (also referred to herein as the "selected applications") are used by the data workflow analysis service 102 to generate one or more data processing pipeline configurations 110 as described herein and one or more of the data processing pipeline configurations 110 is provided as a recommended configuration 112.

In one embodiment, the computing resource service provider 114 provides access to one or more host machines hosted by the computing resource service provider 114. In one embodiment, the computing resource service provider 114 provides access to one or more services in an environment therein. In one embodiment, the one or more services provided by the computing resource service provider 114 are implemented as and/or utilize one or more virtual machine instances that are operating on host machines operating within the computing resource service provider 114 environment. In one embodiment, the computing resource service provider 114 provides a variety of services to users and/or customers of the computing resource service provider 114. In one embodiment, the users and/or customers of the computing resource service provider 114 communicate with the computing resource service provider 114 via an interface such as a web services interface or using some other type of interface. In one embodiment, each of the services operating in an environment of the computing resource service provider 114 has its own interface and, generally, subsets of the services can have corresponding interfaces in addition to or as an alternative to the single interface.

In one embodiment, a user interacts with services of the computing resource service provider (via appropriately configured and authenticated API requests) using a client computing device to provision and operate services that are instantiated on physical computing devices hosted and operated by the computing resource service provider 114 as described herein. These services are configured to manage resources (e.g., storage, processors, memory, network, etc.) associated with the services. These resources are used for various purposes, such as to operate as servers supporting a website, to operate business applications or, generally, to serve as computing power for the customer. Other applications of the services can support database applications, electronic commerce applications, business applications, and/or other such applications.

In one embodiment, the data workflow analysis service 102 is a service provided by the computing resource service provider 114 to manage the migration of customer data processing systems to the computing resource service provider 114 environment. In one embodiment, the data workflow analysis service 102 is a collection of computing resources that operate collectively to process requests to migrate data processing systems to the computing resource service provider 114 environment. These computing resources are configured to process requests to migrate data processing systems to the computing resource service provider 114 environment and include at least one of: computer systems (the computer systems including processors and memory), networks, storage devices, executable code, services, processes, modules, or applications. In one embodiment, the computing resources configured to process requests to migrate data processing systems to the computing resource service provider 114 environment include virtual systems that are implemented on shared hardware hosted by a computing resource service provider such as the computing resource service provider 114. In one embodiment, the data workflow analysis service 102 is implemented as a single system. In one embodiment, the data workflow analysis service 102 is implemented as a distributed system, with a plurality of instances operating collectively to process requests to migrate data processing systems to the computing resource service provider 114 environment. In one embodiment, the data workflow analysis service 102 operates using computing resources (e.g., databases and/or virtual machine instances) that enable the data workflow analysis service 102 to process requests to migrate data processing systems to the computing resource service provider 114 environment.

In one embodiment, the data workflow analysis service 102 maintains data and/or metadata such that, when a request to process requests to migrate data processing systems to the computing resource service provider 114 environment is received, the data and/or metadata is located, processed, and provided (or a streaming data object is initiated) for use in processing the request. In one embodiment, the data and/or metadata maintained by the data workflow analysis service 102 is organized as data objects. In one embodiment, these data objects have arbitrary sizes. In one embodiment, these data objects have constraints on size or durability. Thus, the data workflow analysis service 102 is configured to manage numerous data objects of varying sizes. In one embodiment, the data workflow analysis service 102 stores the data objects in storage resources controlled by the data workflow analysis service 102. In one embodiment, the data workflow analysis service 102 stores the data objects using resources controlled by some other service such as a data storage service. In one embodiment, the data workflow analysis service 102 stores the data objects using a combination of storage locations. In one embodiment, the data workflow analysis service 102 operates as a key value store that associates the data objects with identifiers of the data objects that are used to retrieve or perform other operations in connection with the data objects. In one embodiment, the data workflow analysis service 102 generates metadata associated with the data objects and causes such metadata to process requests to migrate data processing systems to the computing resource service provider 114 environment.

In one embodiment the applications and services 106 include data warehousing applications and services, data processing applications and services, data analysis applications and services, data storage applications and services, data security applications and services, and data management applications and services.

In one embodiment, data workflow attributes 104 include attributes associated with query performance such as data throughput, data query speed, data concurrency, central processing unit ("CPU") usage, memory usage, and network bandwidth. In one embodiment, the attributes are determined based at least in part on an analysis of CPU speed, a CPU type, number of CPUs, amount of memory, type of memory, network bandwidth, peak load, peak load times, and/or other such factors.

In one embodiment, the data workflow analysis service 102 uses data workflow attributes based at least in part on system capabilities of an existing data processing system. The data workflow attributes based at least in part on system capabilities of an existing data processing system include, but are not limited to, the data throughput of the existing data processing system (e.g., the amount of data queries that are executed per second), the database query speed of the existing data processing system (e.g., the delay or latency between a query and a response), the database concurrency of the existing data processing system (e.g., the number of simultaneous users and/or simultaneous queries that the existing data processing system can support), the central processing unit usage of the existing data processing system (e.g., the highest CPU load of the existing data processing system), the memory usage of the existing data processing system (e.g., the highest memory usage of the existing data processing system), the network bandwidth of the existing data processing system (e.g., the amount of network resources used by the existing data processing system), the peak load of the existing data processing system (e.g., the changes in demand for the existing data processing system during a particular time period such as an hour, a day, a week, etc., as compared to the average demand), the peak load times of the existing data processing system (e.g., the times and/or durations of the high demand periods), or the input-output speed of the existing data processing system (e.g., the amount of input and output capacity per unit time used by the existing data processing system).

In one embodiment, data workflow attributes 104 include attributes associated with the volume of the data such as the current volume of the data and the growth rate of the data over time (e.g., the amount of data today and/or the amount of data that is anticipated in the future). In one embodiment, data workflow attributes 104 include attributes associated with the speed of the data such as the time to produce a result from the data, the incoming speed of the data, and whether the data arrives in periodic batches or in a continuous stream. In one embodiment, data workflow attributes 104 include attributes associated with the type of the data such as whether the data is structured, semi-structured, or unstructured, and whether the data includes text, images, audio, video, or multiple data types. In one embodiment, data workflow attributes 104 include attributes associated with processing the data such as any pre-processing operations that are performed on the data, any correlation operations between parts of the data, any additional data that is needed to process the data, how reliable the data is, what should be done with unreliable data, and whether there are custom processing applications that are performed on the data to determine results. In one embodiment, data workflow attributes 104 include attributes relating to the data such as the location of the data, metadata associated with the data, and security and/or regulatory requirements associated with the data (e.g., regulatory requirements, data security requirements, etc.).

In one embodiment, data workflow attributes 104 include a location of a sample data set that is used to further determine the set of applications and/or services that are used to implement the data processing pipeline. In one embodiment, data workflow attributes 104 include limitations and/or considerations associated with the cost to implement the data processing pipeline including, but not limited to, costs for licensing of the applications or services, cost limits (e.g., "not to exceed" costs), preferences based on in-house expertise, preferences based on previously implemented and/or custom applications, and other such cost limitations and/or considerations.

Figure 2:
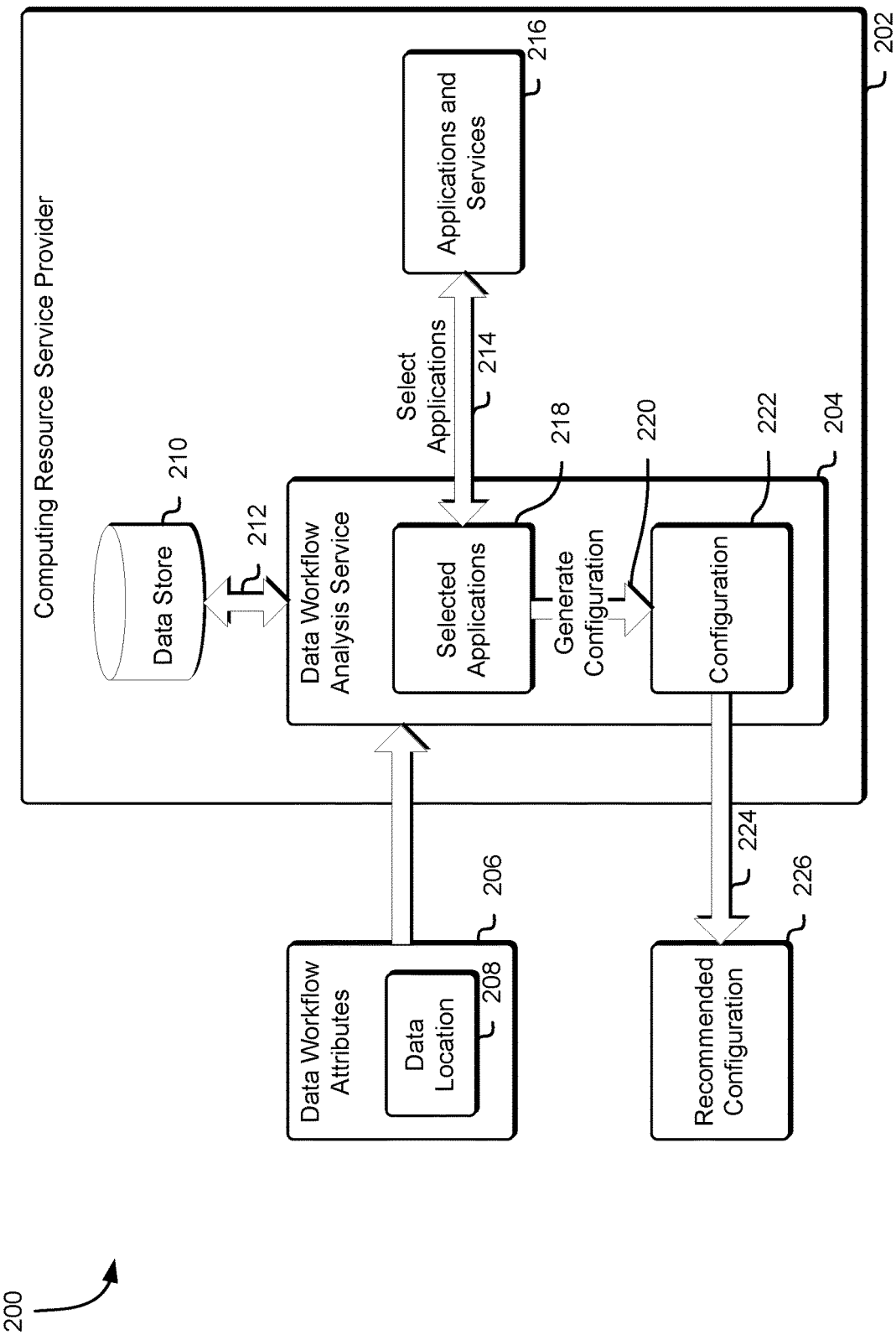
FIG. 2 illustrates an example environment where a data workflow is analyzed and a recommended data processing pipeline configuration is provided using a data workflow analysis service.

FIG. 2 illustrates an example environment 200 where a data workflow is analyzed and a recommended data processing pipeline configuration is provided using a data workflow analysis service as described in connection with FIG. 1 and in accordance with an embodiment. In the example environment 200 illustrated in FIG. 2, a data workflow analysis service 204 operating within an environment of a computing resource service provider 202 as described above receives a set of data workflow attributes 206 that specify one or more aspects of a data workflow. In one embodiment, the set of data workflow attributes 206 includes a data location 208 that specifies the location of a set of data in a data store 210 that is used to analyze the data workflow.

In one embodiment, the set of data in the data store 210 is a large data set. In one embodiment, a large data set (also referred to herein as an "enterprise-scale" data set) is a collection of data pertaining to one or more data sources that is too large to easily process without distributed storage and/or distributed processing, with "petabyte-scale" and "exabyte-scale" being modern examples. Colloquially, data processing of such large data sets is referred to as "big data" processing. In one embodiment, a subset of the set of data in the data store 210 is used to analyze the data workflow. In one embodiment where a large data set includes several petabytes or exabytes of data over a twenty-four period, the large data set may be too large to effectively transport from the location of the set of data in the data store 210 to the data workflow analysis service 204. In one embodiment, the data workflow analysis service 204 retrieves a subset of the set of large data (e.g., one hour's worth of data) and repeats or duplicates the subset a number of times (e.g., twenty-four times) to mimic the full data set.

In one embodiment, the data workflow analysis service 204 retrieves 212 at least a subset of the set of data in the data store 210 from the location specified by the data location 208. In one embodiment, the data location 208 is a uniform resource identifier indicating the location of the set of data in the data store 210. In one embodiment, the data location 208 is a pointer to the set of data in the data store 210. In one embodiment, the data location 208 is an offset indicating the location of the start of the set of data in the data store 210. In one embodiment, the data location 208 is an application programming interface call that includes information usable to determine the location of the set of data in the data store 210. In one embodiment, the data location 208 is a web-services interface call that includes information usable to determine the location of the set of data in the data store 210. In one embodiment, the data that is retrieved is stored in a data storage service such as a block storage service, an on-demand storage service, an archival storage service, or a backup storage service. In one embodiment, the data workflow analysis service 204 uses the subset of the set of data in the data store 210 and the one or more data workflow attributes 206 to select a set of applications 214 from a plurality of applications and services 216 as described herein. In one embodiment, the selected applications 218 are used by the data workflow analysis service 204 to generate 220 one or more data processing pipeline configurations. In one embodiment, one or more of the one or more data processing pipeline configurations 222 is provided 224 as a recommended configuration 226.

It should be noted that while FIG. 2 shows the applications and services 216 as being hosted in the environment of the computing resource service provider 202, in one embodiment, at least a subset of the applications and services 216 are hosted in an environment of a customer of the computing resource service provider 202. In one embodiment, at least a subset of the applications and services 216 are hosted in an environment of a third party (e.g., neither the customer of the computing resource service provider 202 nor the computing resource service provider 202). Similarly, it should be noted that while FIG. 2 shows the set of data in the data store 210 as being located in the environment of the computing resource service provider 202, in one embodiment, the set of data in the data store 210 is located in an environment of a customer of the computing resource service provider 202. In one embodiment, the set of data in the data store 210 is located in an environment of a third party (e.g., neither the customer of the computing resource service provider 202 nor the computing resource service provider 202).

Figure 3:
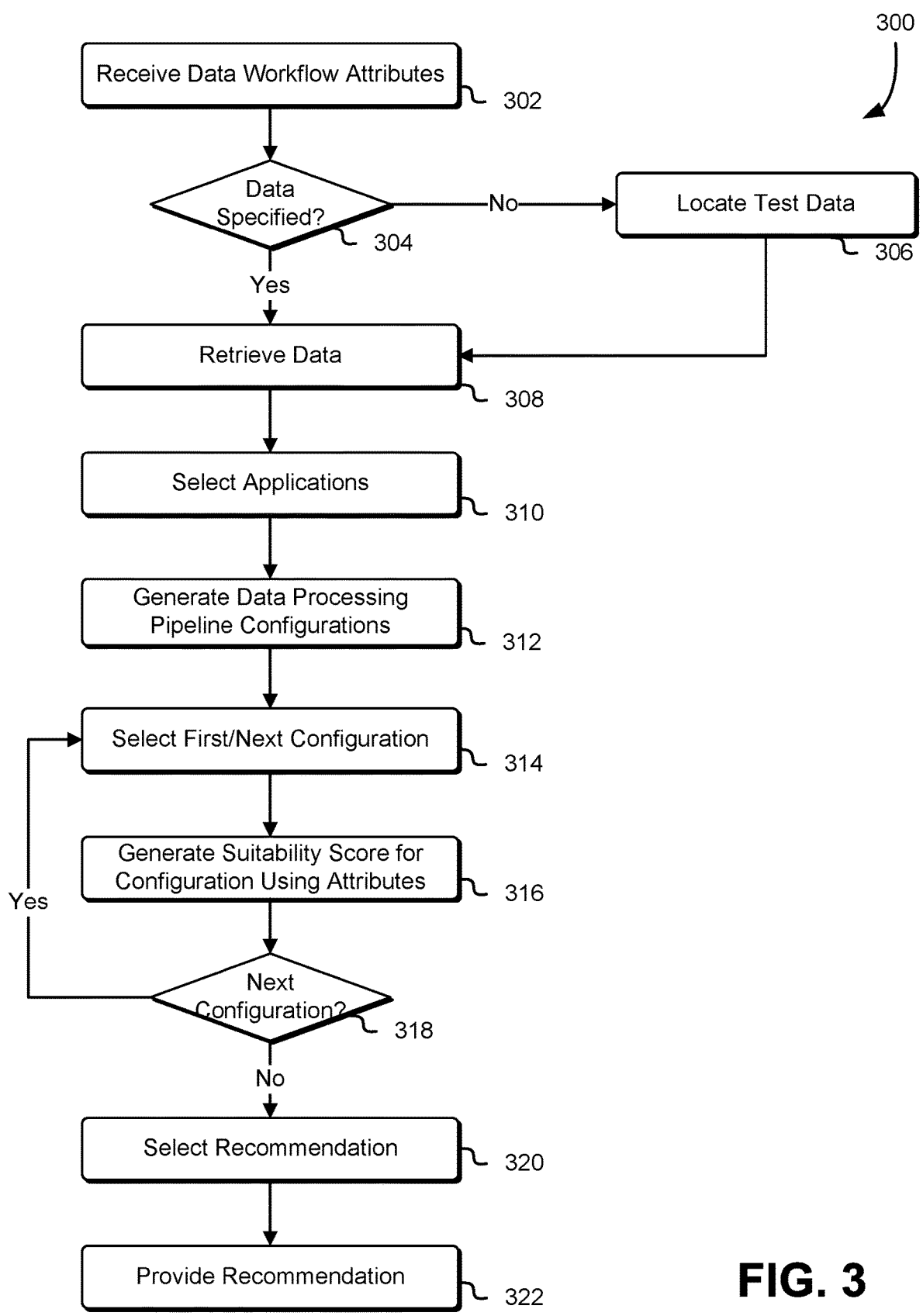
FIG. 3 illustrates an example process for analyzing a data workflow and providing a recommended data processing pipeline configuration using a data workflow analysis service.

FIG. 3 illustrates an example process 300 for analyzing a data workflow and providing a recommended data processing pipeline configuration using a data workflow analysis service as described in connection with FIG. 1 and in accordance with an embodiment. In one embodiment, a data workflow analysis service such as the data workflow analysis service 102 described in connection with FIG. 1 performs the example process 300 illustrated in FIG. 3. As illustrated in FIG. 3, in one embodiment, the data workflow analysis service receives 302 a set of workflow attributes. In one embodiment, the data workflow analysis service determines 304 whether a data location is specified in the set of workflow attributes. In one embodiment, if the data workflow analysis service determines 304 that a data location is specified within the set of workflow attributes, the data workflow analysis service retrieves 308 at least a subset of the set of data from the data location as described herein. In one embodiment, if it is not the case that the data workflow analysis service determines 304 that a data location is specified within the set of workflow attributes, the data workflow analysis service locates 306 test data that is used to analyze the data workflow.

In one embodiment, the data workflow analysis service selects 310 one or more applications and services from a plurality of applications and service based at least in part on the workflow attributes and generates 312 one or more data processing pipeline configurations from the one or more applications and services as described above. In one embodiment, the data workflow analysis service selects 314 the first/next configuration from the one or more data processing pipeline configurations and generates 316 a suitability score for the selected configuration based at least in part on the workflow attributes. In one embodiment, the data workflow analysis service generates 316 a suitability score for the selected configuration by aggregating suitability scores for each application in the data processing pipeline. In one embodiment, a data processing pipeline has five different stages (e.g., data retrieval, data pre-processing, data processing, data post-processing, and data disposal, as described below) and each stage has a normalized suitability score from zero to one. In one embodiment, the suitability scores for the applications for each stage are added together to produce a suitability score from zero to five. In one embodiment, the suitability scores for the applications for each stage are averaged together to produce a suitability score from zero to one. In one embodiment, the suitability scores for the applications for each stage are aggregated using a weighted average (e.g., so that the suitability score for the data processing stage of the data processing pipeline has a greater weight than, for example, the suitability score for the data disposal stage of the data processing pipeline).

In one embodiment, the data workflow analysis service generates 316 a suitability score for the selected configuration based at least in part on the workflow attributes until the data workflow analysis service determines 318 that there are no next configurations to generate suitability scores for. In one embodiment, the data workflow analysis service selects 320 one or more recommended configurations for the data processing pipeline (e.g., one or more sets of applications that, when implemented, perform the data processing operations of the data processing pipeline) and provides 322 the one or more recommended configurations for the data processing pipeline. In one embodiment, the data workflow analysis service implements a recommended configuration of the one or more recommended configurations for the data processing pipeline by instantiating (e.g., by causing the execution of) each of the applications of the recommended configuration and begins processing the data.

Figure 4:
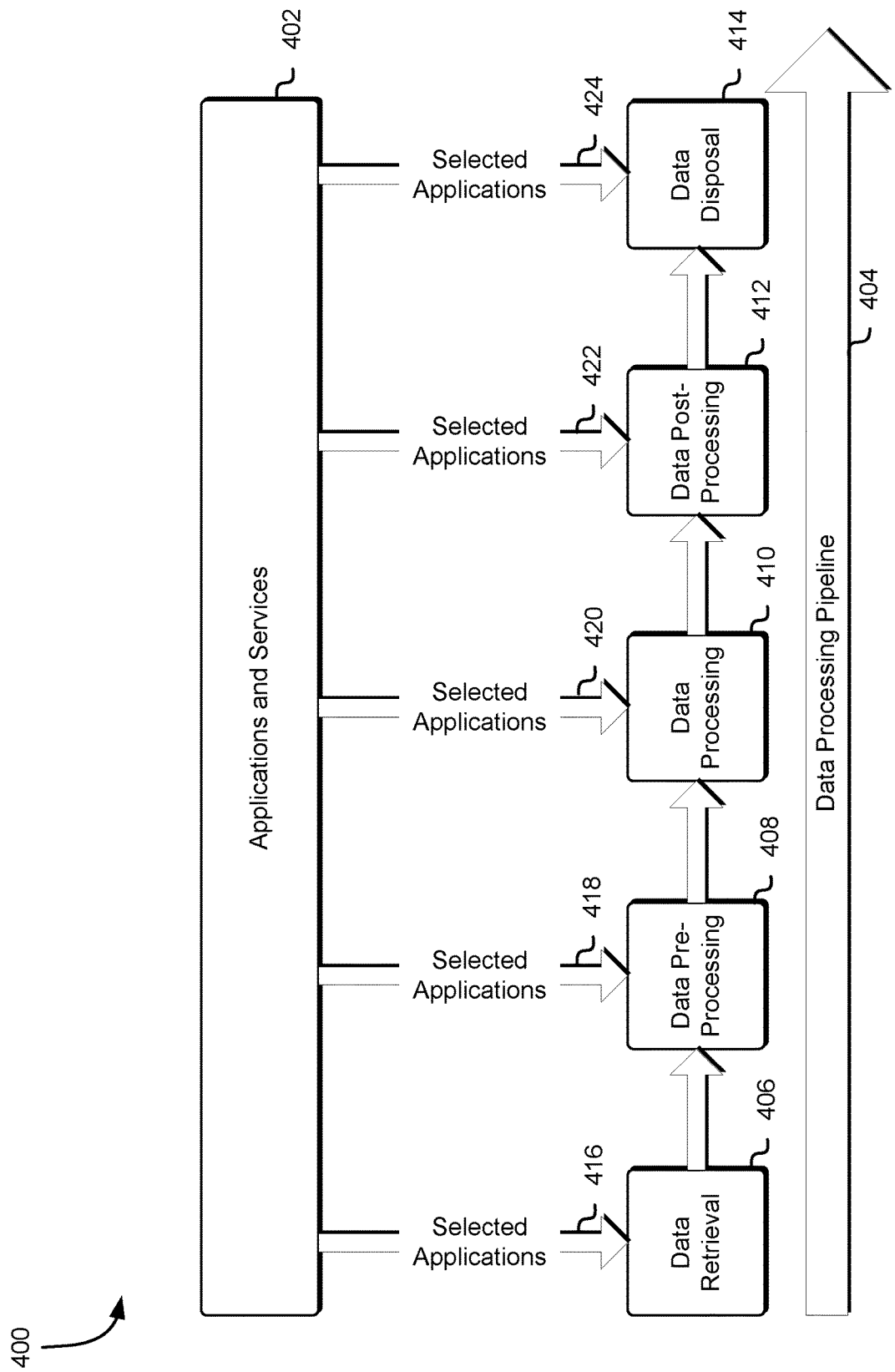
FIG. 4 illustrates an example environment where applications are selected for a data processing pipeline using a data workflow analysis service.

FIG. 4 illustrates an example environment 400 where applications are selected for a data processing pipeline using a data workflow analysis service as described in connection with FIG. 1 and in accordance with an embodiment. In the example environment 400 illustrated in FIG. 4, one or more applications and services from a plurality of applications and services 402 are selected to perform stages of a data processing pipeline 404. In one embodiment, the data processing pipeline 404 has five stages.

In one embodiment, the first stage of the data processing pipeline 404 is data retrieval 406. In one embodiment, data retrieval 406 is the stage of the data processing pipeline where the data that is processed by the data processing pipeline is retrieved from a data storage location as described herein. A data workflow analysis service such as the data workflow analysis service 102 described in connection with FIG. 1 selects one or more applications and services from the plurality of applications and services 402 based at least in part on the data workflow attributes as described above and associates the selected applications 416 with the data retrieval stage of the data processing pipeline 404.

In one embodiment, the selected applications associated with a stage of the data processing pipeline (e.g., the selected applications 416 associated with the data retrieval stage of the data processing pipeline 404) include multiple applications that implement the same functionality. In one embodiment, a plurality of different applications from the plurality of applications and services 402 are selected for a data processing pipeline stage and a data processing pipeline is instantiated with each of the applications of the plurality of applications (e.g., one pipeline corresponding to each different application of the plurality). In one embodiment, a plurality of different applications from the plurality of applications and services 402 are selected for a data processing pipeline stage and a data processing pipeline is instantiated with all of the applications of the plurality of applications (e.g., one pipeline with all of the applications of the plurality, operating together to implement the data processing pipeline stage). In one embodiment, a plurality of different applications from the plurality of applications and services 402 are selected for a data processing pipeline stage and a data processing pipeline is instantiated with a subset of the plurality of applications (e.g., one pipeline with the subset of the applications of the plurality, operating together to implement the data processing pipeline stage). In one embodiment, the data processing pipeline stage is implemented using both multiple pipelines and multiple applications per pipeline stage (e.g., a plurality of pipelines, each with one or more applications operating to implement the data processing pipeline stage).

In one embodiment, the second stage of the data processing pipeline 404 is data pre-processing 408. In one embodiment, data pre-processing 408 is the stage of the data processing pipeline where the data that is processed by the data processing pipeline is pre-processed prior to processing as described herein. A data workflow analysis service such as the data workflow analysis service 102 described in connection with FIG. 1 selects one or more applications and services from the plurality of applications and services 402 based at least in part on the data workflow attributes as described above and associates the selected applications 418 with the data pre-processing stage of the data processing pipeline 404.

In one embodiment, the third stage of the data processing pipeline 404 is data processing 410. In one embodiment, data processing 410 is the stage of the data processing pipeline where the data is processed by the data processing pipeline as described above. A data workflow analysis service such as the data workflow analysis service 102 described in connection with FIG. 1 selects one or more applications and services from the plurality of applications and services 402 based at least in part on the data workflow attributes as described above and associates the selected applications 420 with the data processing stage of the data processing pipeline 404.

In one embodiment, the fourth stage of the data processing pipeline 404 is data post-processing 412. In one embodiment, data post-processing 412 is the stage of the data processing pipeline where the data that is processed by the data processing pipeline is post-processed after processing as described herein. A data workflow analysis service such as the data workflow analysis service 102 described in connection with FIG. 1 selects one or more applications and services from the plurality of applications and services 402 based at least in part on the data workflow attributes as described above and associates the selected applications 422 with the data post-processing stage of the data processing pipeline 404.

In one embodiment, the fifth stage of the data processing pipeline 404 is data disposal 414. In one embodiment, data disposal 414 is the stage of the data processing pipeline where the data that is processed by the data processing pipeline is disposed after processing as described herein. A data workflow analysis service such as the data workflow analysis service 102 described in connection with FIG. 1 selects one or more applications and services from the plurality of applications and services 402 based at least in part on the data workflow attributes as described above and associates the selected applications 424 with the data disposal stage of the data processing pipeline 404.

In one embodiment, a data processing pipeline is implemented as a collection of computing resources that operate collectively to implement a data processing system. In one embodiment, the computing resources used to implement the data processing pipeline operate within the computing resource service provider environment. In one embodiment, the computing resources used to implement the data processing pipeline operate within the customer environment. In one embodiment, the computing resources used to implement the data processing pipeline operate within a third party environment. These computing resources are configured to process data for the data processing system in the hosted environment and include at least one of: computer systems (the computer systems including processors and memory), networks, storage devices, executable code, services, processes, modules, or applications. In one embodiment, the computing resources configured to implement the data processing system of the data processing pipeline include virtual systems that are implemented on shared hardware hosted in an environment (e.g., a computing resource service provider environment). In one embodiment, the data processing pipeline is implemented as a single system. In one embodiment, the data processing pipeline is implemented as a distributed system, with a plurality of instances operating collectively to process data for the data processing system of the data processing pipeline.

In one embodiment, the stages of the data processing pipeline (e.g., data retrieval, data pre-processing, data processing, data post-processing, and data disposal) are implemented as a collection of computing resources that operate collectively to implement the stage of the data processing system. In one embodiment, the computing resources used to implement the stages of the data processing pipeline operate within the computing resource service provider environment. In one embodiment, the computing resources used to implement the stages of the data processing pipeline operate within the customer environment. In one embodiment, the computing resources used to implement the stages of the data processing pipeline operate within a third party environment. In one embodiment, the computing resources used to implement the stages of the data processing pipeline operate within multiple environments (e.g., the computing resource services provider environment, the customer environment, and/or the third party environment). The computing resources used to implement the stages of the data processing pipeline are configured to process data for the data processing system in the hosted environment and include at least one of: computer systems (the computer systems including processors and memory), networks, storage devices, executable code, services, processes, modules, or applications. In one embodiment, the computing resources configured to implement the stages of the data processing pipeline include virtual systems that are implemented on shared hardware hosted in an environment (e.g., the computing resource services provider environment, the customer environment, and/or the third party environment). In one embodiment, the stages of the data processing pipeline are implemented as single systems. In one embodiment, the stages of the data processing pipeline are implemented as distributed systems, with a plurality of instances operating collectively to process data for the stage of the data processing pipeline.

In one embodiment, the resources used to implement the stages of the data processing pipeline maintain data and/or metadata such that, when the data processing pipeline processes data for the data processing system, the data and/or metadata associated with the stage of the data processing pipeline is located, processed, and provided (or a streaming data object is initiated) for use in processing the data. In one embodiment, the data and/or metadata maintained by the resources used to implement the stages of the data processing pipeline is organized as data objects. In one embodiment, these data objects have arbitrary sizes. In one embodiment, these data objects have constraints on size or durability. In one embodiment, the resources used to implement the stages of the data processing pipeline store the data objects in storage resources controlled by the resources used to implement the stages of the data processing pipeline. In one embodiment, the resources used to implement the stages of the data processing pipeline store the data objects in storage resources controlled by the data workflow analysis service. In one embodiment, the resources used to implement the stages of the data processing pipeline store the data objects using resources controlled by some other service such as a data storage service. In one embodiment, the resources used to implement the stages of the data processing pipeline store the data objects using a combination of storage locations.

Figure 5:
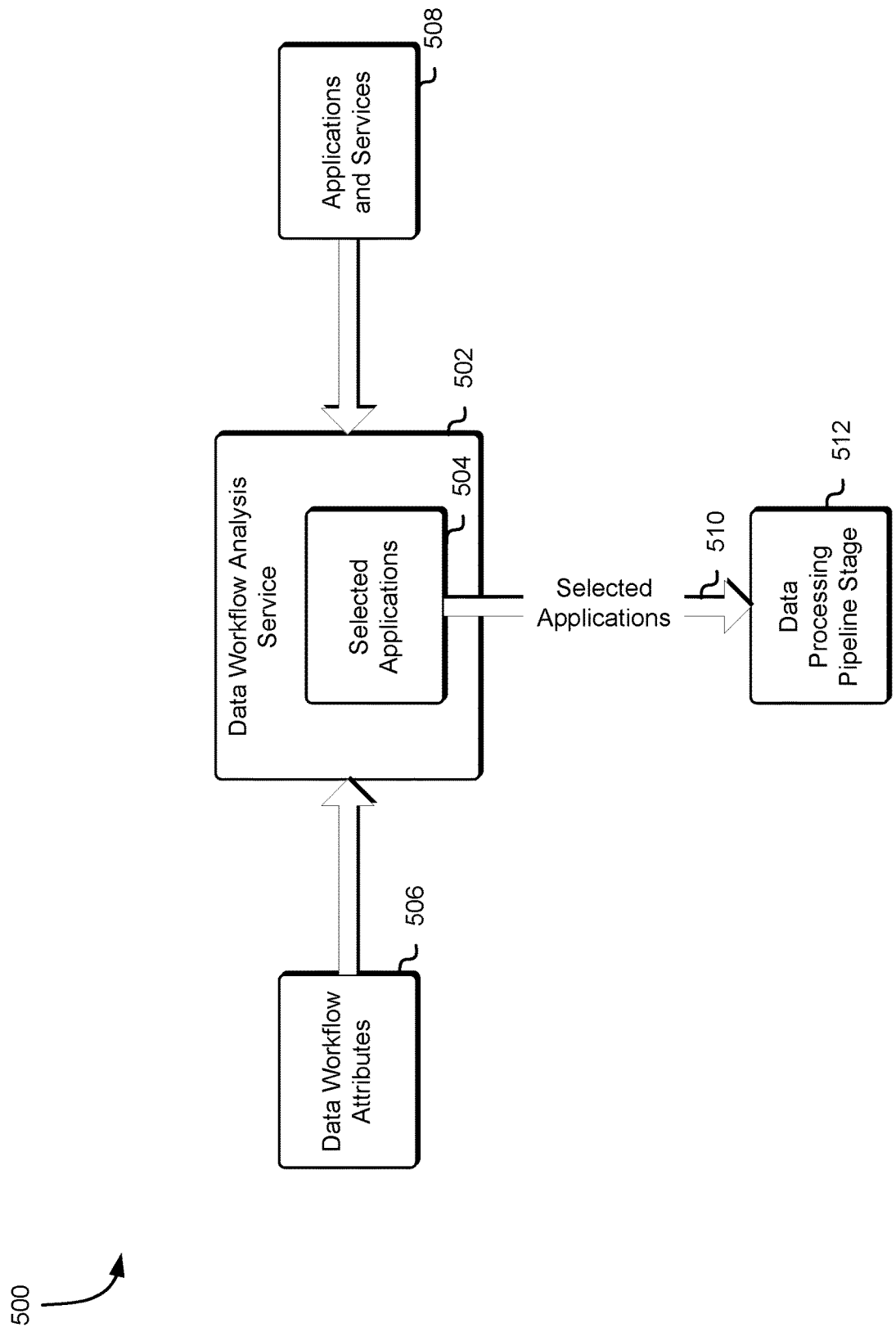
FIG. 5 illustrates an example environment where applications are selected for a data processing pipeline stage using a data workflow analysis service.

FIG. 5 illustrates an example environment 500 where applications are selected for a data processing pipeline stage using a data workflow analysis service as described in connection with FIG. 1 and in accordance with an embodiment. In the example environment 500 illustrated in FIG. 5, a data workflow analysis service 502 uses data workflow attributes 506 to select one or more selected applications 504 from a plurality of applications and services 508. In one embodiment, the data workflow analysis service associates 510 the one or more selected applications 504 with the data processing pipeline stage 512 (e.g., data retrieval, data pre-processing, data processing, data post-processing, data disposal) as described above.

In one embodiment, the applications selected for a data processing pipeline stage are implemented on the collection of resources used to implement the data processing pipeline stage described above, in connection with FIG. 4 (e.g., the resources include at least one of: computer systems (the computer systems including processors and memory), networks, storage devices, executable code, services, processes, or modules). In one embodiment, the applications selected for a data processing pipeline stage are provided by the computing resource service provider and executed on the resources when the data processing pipeline is implemented by instantiating the applications. In one embodiment, the applications selected for a data processing pipeline stage are provided by the customer of the computing resource service provider and executed on the resources when the data processing pipeline is implemented. In one embodiment, the applications selected for a data processing pipeline stage are provided by a third party (e.g., neither the computing resource service provider nor the customer of the computing resource service provider) and executed on the resources when the data processing pipeline is implemented.

In an illustrative example, the data processing pipeline stage is a data processing stage and there are five possible applications in the plurality of applications and services that are data processing applications. In the illustrative example, the data workflow attributes specify that the data processing application should handle streaming data, that the data processing application should handle enterprise-scale data, that the data processing application should be open source, and that the data processing application should conform to the Health Insurance Portability and Accountability Act of 1996 (e.g., must be "HIPAA" compliant).

If the first of the data processing applications handles streaming data, does not handle enterprise-scale data well, is open source, and is HIPAA compliant, the first of the data processing applications may have a moderate suitability score (e.g., 0.7 on a scale of zero to one). If the second of the data processing applications handles streaming data, handles enterprise-scale data well, is not open source, and is not HIPAA compliant, the second of the data processing applications may have a lower suitability score (e.g., 0.5 on a scale of zero to one). If the third of the data processing applications handles streaming data, does not handle enterprise-scale data well, is not open source, and is not HIPAA compliant, the third of the data processing applications may have an even lower suitability score (e.g., 0.3 on a scale of zero to one). If the fourth of the data processing applications does not handle streaming data, does not handle enterprise-scale data well, is not open source, and is not HIPAA compliant, the fourth of the data processing applications may have a low suitability score (e.g., 0.1 on a scale of zero to one). If the fifth of the data processing applications handles streaming data, handles enterprise-scale data well, is open source, and is HIPAA compliant, the fifth of the data processing applications may have a high suitability score (e.g., 0.9 on a scale of zero to one).

In one embodiment, the data workflow analysis service 502 will recommend the fifth of the data processing applications for the data processing stage of the data processing pipeline. In one embodiment, the data workflow analysis service 502 will recommend the fifth and the first data processing applications if their suitability scores exceed a threshold value (e.g., 0.65). In one embodiment, the data workflow analysis service 502 will recommend all five of the data processing applications and include their suitability scores and/or an analysis as to their suitability.

Figure 6:
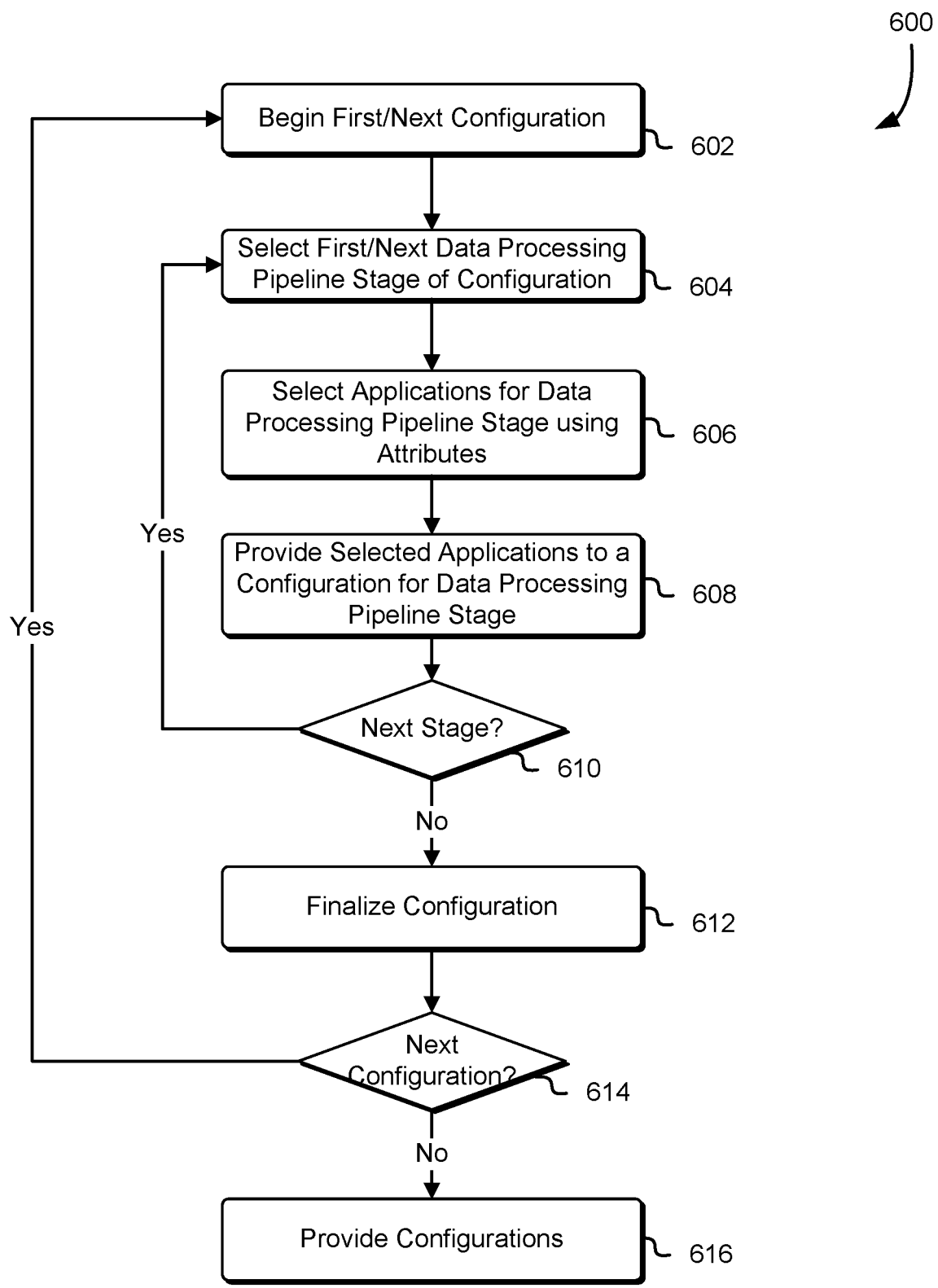
FIG. 6 illustrates an example process for selecting applications for a data processing pipeline configuration using a data workflow analysis service.

FIG. 6 illustrates an example process 600 for selecting applications for a data processing pipeline configuration using a data workflow analysis service as described in connection with FIG. 1 and in accordance with an embodiment. In one embodiment, a data workflow analysis service such as the data workflow analysis service 102 described in connection with FIG. 1 performs the example process 600 illustrated in FIG. 6. In the example process 600 illustrated in FIG. 6, the data workflow analysis service begins producing 602 the first/next data processing pipeline configuration by selecting 604 the first/next data processing pipeline stage of the data processing pipeline configuration (e.g., the data retrieval stage). In one embodiment, the data workflow analysis service selects 606 applications for the selected data processing pipeline stage by evaluating applications of the plurality of applications available using the data workflow attributes, as described herein. In one embodiment, the data workflow analysis service selects 606 applications for the selected data processing pipeline stage from a subset of the plurality of applications by selecting only those applications designated to be applicable to the selected data processing pipeline stage. In an illustrative example, if the data workflow analysis service is selecting applications for the data retrieval stage of the data processing pipeline, the data workflow analysis service selects 606 applications for the selected data processing pipeline stage from a subset of the plurality of applications that are designated as data retrieval applications. In one embodiment, an application has multiple designations (e.g., the application is designated as a pre-processing application, a data processing application, and a post-processing application).

In one embodiment, the data workflow analysis service provides 608 the selected applications to a configuration for the data processing pipeline and associates the selected applications with the selected data processing pipeline stage as described above. In one embodiment, the data workflow analysis service determines 610 whether there are more stages of the data processing pipeline to select and, if so, continues by selecting 604 the next pipeline stage of the data processing pipeline configuration (e.g., the data pre-processing stage). In one embodiment, when the data workflow analysis service determines 610 that there are no more stages of the data processing pipeline to select, the data workflow analysis service finalizes 612 the configuration. In one embodiment, the data workflow analysis service finalizes 612 the configuration by verifying the configuration is operable to perform the data processing operations of the data processing pipeline. In one embodiment, the data workflow analysis service finalizes 612 the configuration by processing the configuration into a list, a map, or some other human-readable form. In one embodiment, the data workflow analysis service finalizes 612 the configuration by generating a template corresponding to the configuration that is used to implement the data processing pipeline as described herein. In one embodiment, the data workflow analysis service finalizes 612 the configuration by instantiating the data processing pipeline.

In one embodiment, the data workflow analysis service determines 614 whether there are more configurations to produce and, if so, continues by selecting the next configuration to produce. In one embodiment, if the data workflow analysis service determines 614 that there are not more configurations to produce, the data workflow analysis service provides 616 the configurations as described herein.

FIG. 7 illustrates a diagram 700 where an example decision matrix is used to select applications for a data processing pipeline configuration using a data workflow analysis service as described in connection with FIG. 1 and in accordance with an embodiment. In one embodiment, the decision matrix is used by the data workflow analysis service to determine the suitability of the set of applications in a data processing pipeline configuration. In one embodiment, the decision matrix is implemented in computer memory using a data structure such as a matrix, a lookup table, a control table, or a decision tree. In the example diagram 700 illustrated in FIG. 7, a decision matrix 702 with rows of attributes (e.g., $Attribute_0$, $Attribute_1$, etc.) and columns of applications (e.g., $Application_0$, $Application_1$, etc.) has decision values (e.g., $Score_{00}$, $Score_{01}$, $Score_{02}$, etc.) for each row and column. Each of the decision values (also referred to herein as "suitability scores") is a measure of how suitable a particular application is with respect to a particular attribute. In one embodiment, the decision values of the decision matrix are numbers (e.g., from zero to one). In one embodiment, the decision values of the decisions matrix are Likert values (e.g., either positive or negative). In one embodiment, the decision values are a range of suitability values (e.g., "very bad," "bad," "neutral," "good," and "very good").

In the example diagram 700 illustrated in FIG. 7, three attributes are specified data workflow attributes 704 (e.g., $Attribute_0$, $Attribute_2$, and $Attribute_m$) and, accordingly, a decision value for $Application_0$ is determined for the specified data workflow attributes 704 using the decision matrix by aggregating $Score_{00}$, $Score_{20}$, and $Score_{m0}$ as described herein. Similarly, a score for Application is determined for the specified data workflow attributes 704 using the decision matrix by aggregating $Score_{02}$, $Score_{22}$, and $Score_{m2}$ as described herein.

Figure 8:
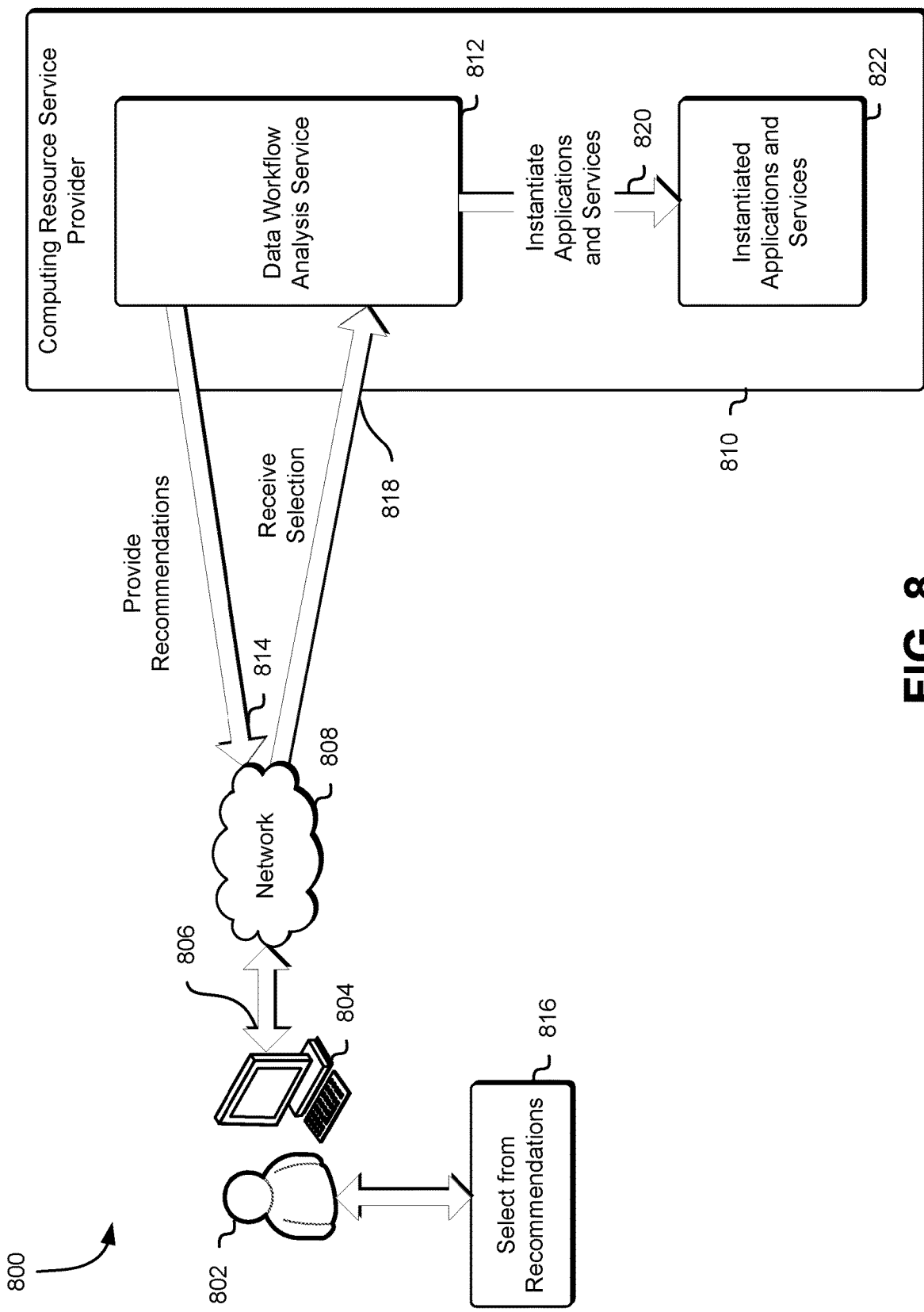
FIG. 8 illustrates an example environment where a data processing pipeline configuration is selected from one or more configurations and instantiated using a data workflow analysis service.

FIG. 8 illustrates an example environment 800 where a data processing pipeline configuration is selected from one or more configurations and implemented using a data workflow analysis service as described in connection with FIG. 1 and in accordance with an embodiment. In one embodiment, a user 802 connects 806 to a data workflow analysis service 812 of a computing resource service provider 810 using a client computing device 804 via a network 808.

In one embodiment, the user 802 associated with the computing resource service provider 810 begins the process of determining which data processing pipeline elements to migrate to the computing resource service provider 810 environment by issuing a command to begin the migration from the client computing device 804. In one embodiment, the user 802 (also referred to herein as a "customer") of the computing resource service provider 810 begins the process of determining which data processing pipeline elements to migrate to by issuing a command to determine one or more recommendations for the migration from the client computing device 804. In one embodiment, the command to begin the migration is generated by the user 802 of the computing resource service provider 810 who uses the client computing device 804 to connect to a variety of services provided by the computing resource service provider 810 as described herein. In one embodiment, the user 802 uses the client computing device 804 to connect to the computing resource service provider 810 over a network 808 such as those networks described herein. As described above, a computing resource service provider 810 provides a distributed, virtualized, and/or datacenter environment within which one or more applications, processes, services, virtual machines, and/or other such computer system entities are executed. In one embodiment, the user 802 is a process running on one or more remote computer systems controlled by a customer of the computing resource service provider 810.

In one embodiment, commands to the computing resource service provider 810 originate from an outside computer system. In one embodiment, commands to the computing resource service provider 810 originate from within the computing resource service provider environment. In one embodiment, the commands to connect to the computing resource service provider 810 are sent to the computing resource service provider 810 and/or to other services operating in the environment therein, without the direct intervention of the user 802 (i.e., commands to connect to the computing resource service provider 810 are generated automatically in response to one or more events). In one embodiment, the user 802 connects to the computing resource service provider 810 using a privileged user account associated with the customer of the computing resource service provider 810. In one embodiment, the user 802 uses a privileged user account associated with and/or provided by the computing resource service provider 810.

In one embodiment, when the data workflow analysis service 812 provides 814 the recommendations for the data processing pipeline configuration to the client computing device 804 of the user 802 using the techniques described herein, the user 802 uses the client computing device 804 to select 816 a recommended data processing pipeline configuration from the recommendations for the data processing pipeline configuration provided and sends the selected data processing pipeline configuration to the data workflow analysis service 812.

In one embodiment, the data workflow analysis service 812 provides 814 a subset of the recommendations. In one embodiment, the data workflow analysis service 812 provides 814 a subset of the recommendations using an expert system (e.g., an expert system is used to determine a subset of the recommendations using knowledge programmed into the expert system that is based on previous recommendations and/or previous experimentation).

In one embodiment, the data workflow analysis service 812 provides 814 a subset of the recommendations using a machine learning algorithm that maps data processing pipeline migration requests to past requests using an approach such as a decision tree algorithm, a probabilistic classifier algorithm, a least-squares regression algorithm, a support vector machine, or various unsupervised learning algorithms. In one embodiment, the machine learning algorithm is used to provide additional input to the data workflow analysis service 812 when selecting the subset of the recommendations by using past results of successful data processing pipeline migration recommendations. In one embodiment, the machine learning algorithm is implemented on computer systems associated with the data workflow analysis service.

In one embodiment, the data workflow analysis service 812 provides 814 a subset of the recommendations based at least in part on a human expert that evaluates the recommendations for the data processing pipeline configuration provided and determines the subset.

In one embodiment, a service operating within the computing resource service provider 810 selects the recommended data processing pipeline configuration from the recommendations for the data processing pipeline configuration provided. In one embodiment, the service operating within the computing resource service provider that selects the recommended data processing pipeline configuration from the recommendations for the data processing pipeline configuration provided selects the recommended data processing pipeline configuration using an expert system. In one embodiment, the service operating within the computing resource service provider that selects the recommended data processing pipeline configuration from the recommendations for the data processing pipeline configuration provided selects the recommended data processing pipeline configuration using a machine learning algorithm. In one embodiment, the service operating within the computing resource service provider that selects the recommended data processing pipeline configuration from the recommendations for the data processing pipeline configuration provided selects the recommended data processing pipeline configuration based at least in part on a human expert that evaluates the recommendations for the data processing pipeline configuration provided and determines a recommendation.

In one embodiment, when the data workflow analysis service 812 receives 818 the selections (e.g., from the user, from the expert system, from the machine learning algorithm, and/or from the human expert), the data workflow analysis service 812 instantiates 820 the applications and services and the instantiated applications and services 822 are used to implement the data processing pipeline as described herein.

Figure 9:
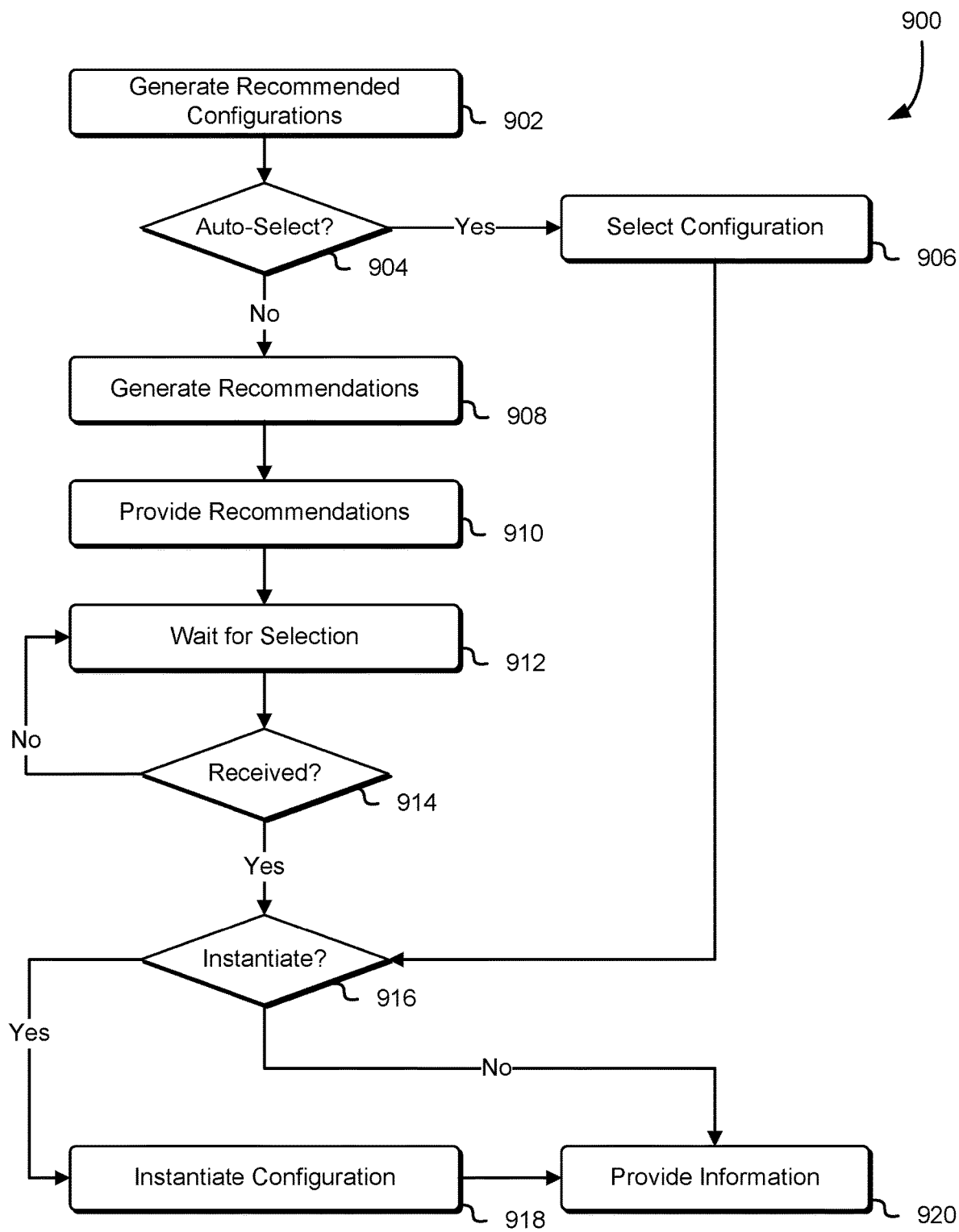
FIG. 9 illustrates an example process for selecting and instantiating a data processing pipeline configuration using a data workflow analysis service.

FIG. 9 illustrates an example process 900 for selecting and instantiating a data processing pipeline configuration using a data workflow analysis service as described in connection with FIG. 1 and in accordance with an embodiment. In one embodiment, a data workflow analysis service such as the data workflow analysis service 102 described in connection with FIG. 1 performs the example process 900 illustrated in FIG. 9. In the example process 900 illustrated in FIG. 9, the data workflow analysis service generates 902 the one or more recommended data processing pipeline configurations as described herein and determines 904 whether to automatically select a configuration of the one or more recommended data processing pipeline configurations using the techniques also described herein (e.g., using an expert system, using a machine learning algorithm, or using a human expert).

In one embodiment, if the data workflow analysis service determines 904 to not automatically select a configuration of the one or more recommended data processing pipeline configurations, the data workflow analysis service generates 908 a list of recommended data processing pipeline configurations. In one embodiment, the data workflow analysis service generates 908 the list of recommended data processing pipeline configurations and includes a suitability score for each of the recommended data processing pipeline configurations. In one embodiment, the data workflow analysis service generates 908 the list of recommended data processing pipeline configurations and includes a cost-benefit analysis for each of the recommended data processing pipeline configurations (e.g., a comparison of the cost of a data processing pipeline configuration and the benefits of choosing that configuration).

In one embodiment, the data workflow analysis service provides 910 the recommended data processing pipeline configurations and waits 912 for a selection to be made. In one embodiment, the selection is made by the customer of the computing resource service provider. In one embodiment, the selection is made by a service of the computing resource service provider (e.g., using an expert system or a machine learning algorithm). In one embodiment, the selection is made by a human expert associated with the computing resource service provider. In one embodiment, if the data workflow analysis service determines 904 to automatically select a configuration of the one or more recommended data processing pipeline configurations, the data workflow analysis service selects 906 the configuration without waiting for a selection. In one embodiment, the selection is made by a service of the computing resource service provider (e.g., using an expert system or a machine learning algorithm). In one embodiment, the selection is made by a human expert associated with the computing resource service provider.

In one embodiment, when the selection is received 914 or when the data workflow analysis service selects 906 the configuration, the data workflow analysis service determines 916 whether to instantiate the applications and services of the configuration. In one embodiment, if the data workflow analysis service determines 916 to not instantiate the applications and services of the configuration, the data workflow analysis service provides 920 information about the selected configuration. In one embodiment, if the data workflow analysis service determines 916 to instantiate the applications and services of the configuration, the data workflow analysis service instantiates 918 the configuration and provides 920 information about the instantiated configuration.

Figure 10:
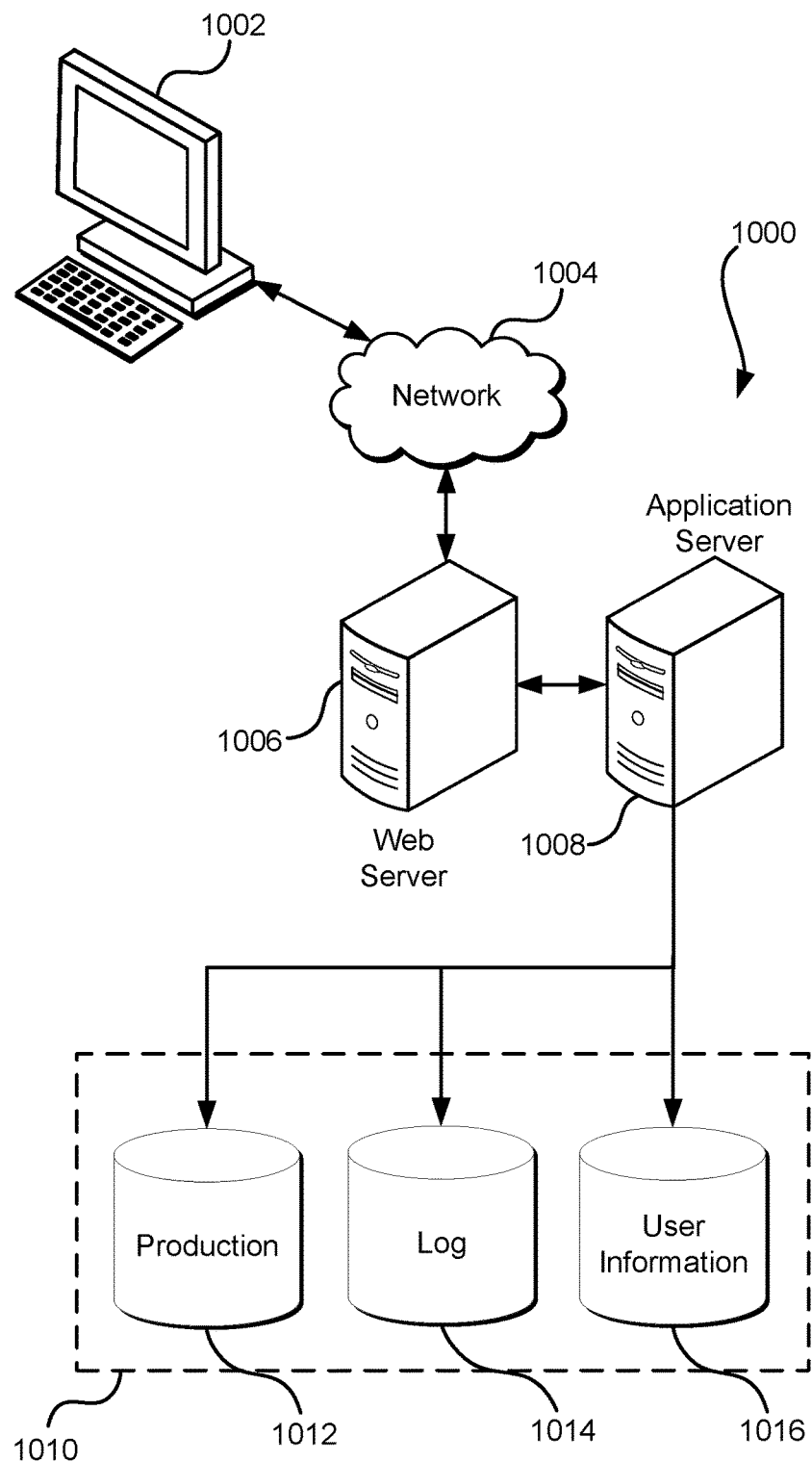
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a set of attributes that indicates a location, of a plurality of locations, of a subset of a data set, wherein the plurality of locations collectively comprise the data set;
obtaining, from the location, a subset of the data set;
selecting, from a plurality of data processing applications, a set of data processing applications based at least in part on the set of attributes and a set of metrics associated with each data processing application of the set of data processing applications;
generating a plurality of specifications, each specification of the plurality of specifications indicating a different configuration of the set of data processing applications;
processing the plurality of specifications, the set of metrics, and the set of attributes to generate a plurality of suitability scores, each suitability score of the plurality of suitability scores associated with a respective specification of the plurality of specifications; and
selecting, based at least in part on the plurality of suitability scores, a specification from the plurality of specifications.

2. The computer-implemented method of claim 1, wherein the data set is an enterprise-scale data set.

3. The computer-implemented method of claim 1, wherein the selecting the set of data processing applications is based at least in part on a decision matrix, the decision matrix indicating, for each data processing application of the plurality of data processing applications, one or more decision values associated with a different subset of the set of attributes.

4. The computer-implemented method of claim 1, further comprising:
implementing a data processing pipeline that, when executed, processes the data set to generate a set of results based at least in part on the data set, the data processing pipeline implemented based at least in part on the specification from the plurality of specifications by at least instantiating each of the data processing applications of the set of data processing applications according to a configuration of the specification from the plurality of specifications.

5. A system, comprising:
memory comprising computer-executable instructions which, if performed by one or more processors, cause the system to at least:
select, from a plurality of applications, a set of applications based at least in part on a set of attributes and a set of metrics associated with the set of applications, wherein the set of attributes indicates a location from a plurality of locations that corresponds to a plurality of subsets of a data set;

generate a specification indicating a configuration of the set of applications;

process the specification using the set of attributes and the set of metrics to determine a suitability score associated with the specification; and determine, based at least in part on the suitability score, to implement the set of applications according to the specification.

6. The system of claim 5, wherein the set of attributes and the set of metrics includes the location of the data set.

7. The system of claim 5, wherein the set of applications, when instantiated according to the specification, is a data processing pipeline that, when implemented, processes the data set to generate a set of results based at least in part on the data set.

8. The system of claim 7, wherein the data processing pipeline includes at least one of: a data retrieval stage, a data pre-processing stage, a data processing stage, a data post-processing stage, or a data disposal stage.

9. The system of claim 5, wherein the computer-executable instructions further include computer-executable instructions which, if performed by the one or more processors, cause the system to at least instantiate the set of applications according to the specification by instantiating each application of the set of applications based at least in part on the configuration.

10. The system of claim 5, wherein the computer-executable instructions that cause the system to select, from the plurality of applications, the set of applications, cause the system to select the set of applications based at least in part on a decision matrix, the decision matrix indicating, for each application of the plurality of applications, one or more decision values associated with a subset of the set of attributes and the set of metrics.

11. The system of claim 5, wherein the computer-executable instructions that cause the system to process the specification using the set of attributes and the set of metrics to determine the suitability score associated with the specification, cause the system to determine the suitability score based at least in part on a decision matrix, the decision matrix indicating, for each application of the plurality of applications, one or more decision values associated with a subset of the set of attributes and the set of metrics.

12. The system of claim 11, wherein the suitability score associated with the specification is determined by aggregating one or more decision values of the decision matrix, the one or more decision values selected from the decision matrix based at least in part on the set of applications of the specification.

13. A non-transitory computer-readable storage medium having stored thereon executable instructions that, as a result of being executed by one or more processors of a computer system, cause the computer system to at least:

select, from a plurality of applications, a set of applications based at least in part on a set of attributes and a set of metrics associated with the set of applications, wherein the set of attributes indicates a location of a plurality of locations that corresponds to a plurality of subsets of a data set;

generate a specification indicating a configuration of the set of applications;

process the specification using the set of attributes and the set of metrics to determine a suitability score associated with the specification; and determine, based at least in part on the suitability score, to implement the set of applications according to the specification.

14. The non-transitory computer-readable storage medium of claim 13, wherein the instructions that cause the computer system to generate the specification indicating the configuration of the set of applications cause the computer system to generate the specification using an expert system based at least in part on one or more previous configurations of sets of applications of the plurality of applications.

15. The non-transitory computer-readable storage medium of claim 13, wherein the instructions that cause the computer system to generate the specification indicating the configuration of the set of applications cause the computer system to generate the specification based at least in part on a machine learning algorithm, the machine learning algorithm based at least in part on one or more previous configurations of sets of applications of the plurality of applications.

16. The non-transitory computer-readable storage medium of claim 13, wherein the set of applications, when instantiated according to the specification, is a data processing pipeline that, when executed, processes the data set to generate a set of results based at least in part on the data set.

17. The non-transitory computer-readable storage medium of claim 16, wherein the data processing pipeline is implemented according to the specification by at least instantiating each of the applications of the set of applications according to the configuration of the specification.

18. The non-transitory computer-readable storage medium of claim 13, wherein one or more of the applications of the plurality of applications are data processing applications.

19. The non-transitory computer-readable storage medium of claim 13, wherein the instructions that cause the computer system to determine, based at least in part on the suitability score, to implement the set of applications according to the specification further include instructions that cause the computer system to:

provide the specification to a computing device of a customer associated with the computer system; and receive, from the computing device of the customer, an indication to implement the set of applications according to the specification.

20. The non-transitory computer-readable storage medium of claim 13, wherein the instructions that cause the computer system to determine, based at least in part on the suitability score, to implement the set of applications according to the specification cause the computer system to determine to implement the set of applications according to the specification based at least in part on a cost-benefit analysis of each application of the set of applications.

* * * * *